(No Model.)
R. C. FAY.
BICYCLE.
No. 601,710. Patented Apr. 5, 1898.
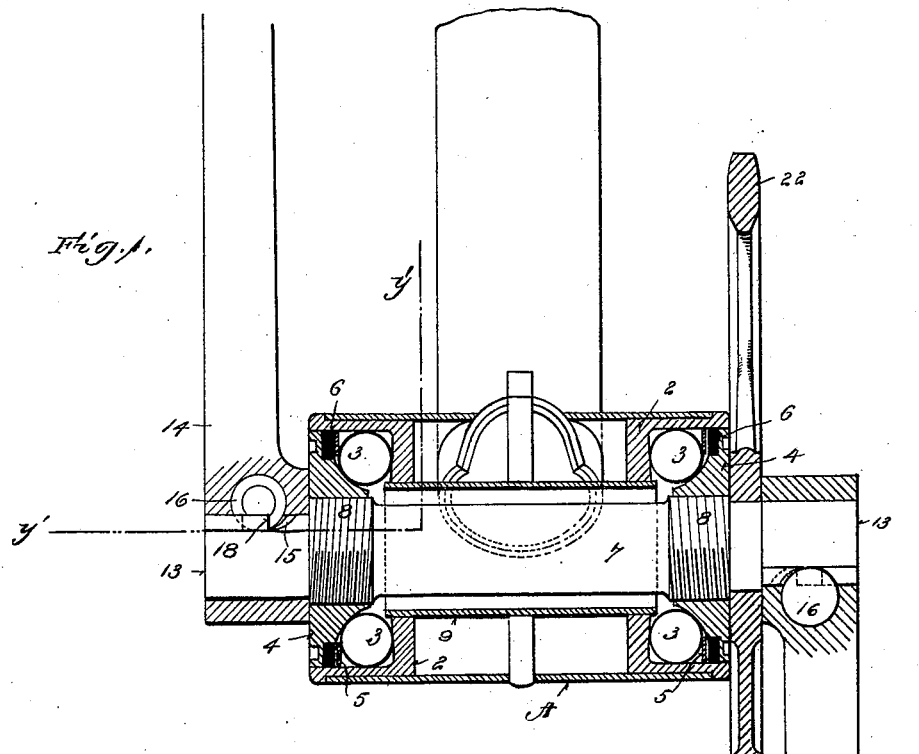
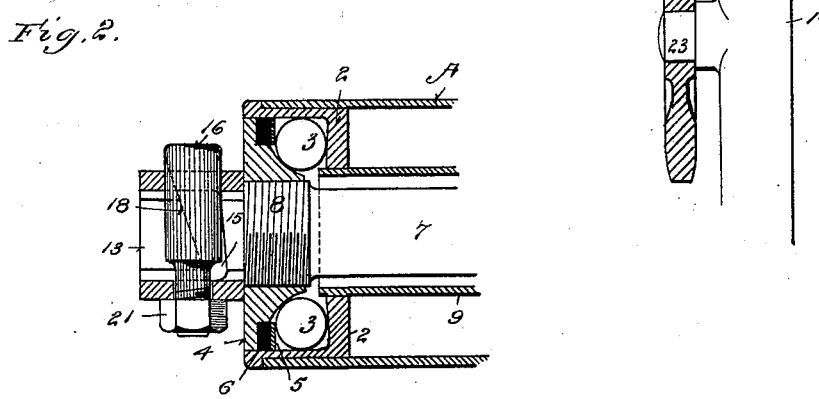
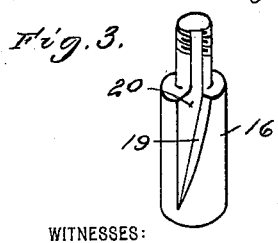 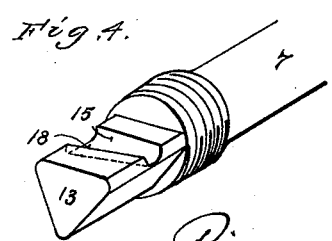 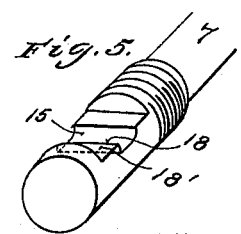
WITNESSES:
Jas. C. Dawley
P. A. Scharfer
INVENTOR
Rimmon C. Fay,
BY
H. A. Toulmin,
ATTORNEY.

UNITED STATES PATENT OFFICE.

RIMMON C. FAY, OF SPRINGFIELD, OHIO, ASSIGNOR TO THE THOMAS MANUFACTURING COMPANY, OF SAME PLACE.

BICYCLE.

SPECIFICATION forming part of Letters Patent No. 601,710, dated April 5, 1898.

Application filed September 17, 1896. Serial No. 606,092. (No model.)

*To all whom it may concern:*

Be it known that I, RIMMON C. FAY, a citizen of the United States, residing at Springfield, in the county of Clark and State of Ohio, have invented certain new and useful Improvements in Bicycles, of which the following is a specification, reference being had therein to the accompanying drawings.

My invention relates to certain new and useful improvements in bicycles.

The object I have in view is to improve the means of mounting and securing the pedals or cranks upon their shaft in such wise as to draw the cranks firmly against the outside of the cones or other fixed part by means of a wedge-like action.

In the accompanying drawings, on which like reference letters and numerals indicate corresponding parts, Figure 1 is a vertical sectional view in a transverse direction of the hanger and the contained parts with portions of the frame and cranks or pedals in elevation; Fig. 2, a detail sectional view on the line $y'\ y'$ of Fig. 1; Fig. 3, a detail perspective view of the wedging-bolt; Fig. 4, a detail perspective view of the crank or pedal shaft, and Fig. 5 a like view showing a modified form of such shaft.

Within the hanger-shell A are fitted, as usual, the ball-bearings 2, having therein balls 3, riding upon cone-bearings 4, with a metallic washer 5 next to the balls and a felt washer or similar washer 6, the latter to exclude dust. The cone-bearings are screwed upon an arbor or shaft 7 in the usual manner, as seen at 8, and the sleeve 9 is fitted around its shaft and to the bearings 2, as usual.

Coming now particularly to the feature of my invention, it will be seen (see Fig. 4 especially) that the end of the shaft or arbor 7 is of triangular form, as shown at 13. The eye in the crank or pedal 14 corresponds in shape and is fitted snugly upon this triangular projection. One face of the projection is cut out to form a recess 15, into which fits a part of a wedge-bolt 16, the remaining part of the bolt fitting an eye-opening 17 in the crank, as shown particularly in Fig. 1. One side of the recess 15 is formed with an inclined or angular shoulder 18, as seen particularly in Figs. 2 and 4, the line of the shoulder being oblique to the ends of the projections. The wedge-bolt 16 has a corresponding shoulder 19, being cut out at 20 to form said shoulder and incidentally a recess, so that when in place such recess receives the shoulder 18, the upright wall of which fits against the wall or shoulder proper, 19. The bolt 16 is threaded and provided with a nut 21, by which it is drawn so that the shoulder 19 travels against the shoulder 18 and shifts the bolt inward, carrying with it the crank and binding it firmly against an opposing surface, constituted, in the form shown, at one end of the cone-bearing 4 and at the other end of the sprocket-wheel. Thus I am enabled to hold the crank or pedal in the firmest manner upon the arbor or shaft and to keep it tight and also retain the adjusting-cone in its proper position.

At 22 is shown a sprocket-wheel for driving a chain which propels the machine. This wheel is fitted upon the shaft or arbor 7 and is tightly clamped between the cone-bearing 4 and the crank by the action of the wedge-bolt 16. The stud 23 on the crank enters an eye in the sprocket-wheel and thus locks the two parts together.

I regard myself as the first to connect the crank or pedal with the shaft by means of inclined shoulders and involving a wedge-bolt by which the crank or pedal is drawn tightly against the opposing surface.

In Fig. 5 I have shown the crank shaft or arbor as round instead of triangular with a flat side at 18', but with the shoulder 18 and the recess 15, the same as in Fig. 7. I wish to be understood as contemplating any form of cross-section of arbor so long as the other features are preserved.

It will be observed that by removing the wedge-bolt and crank I can take off the sprocket-wheel and reverse it side for side, so that after the teeth are worn on one face their other face can be presented to the sprocket-chain. After so reversing the sprocket-wheel the stub on the crank will still enter the hole in the spoke of the wheel, so that the connection is formed in either position. A fixed part against which the sprocket-wheel is placed is formed in the arrangement shown by the adjusting cone-bearing.

Having thus fully described my invention, what I claim as new, and desire to secure by Letters Patent, is—

1. In a bicycle, the combination with the driving shaft or arbor having a projection recessed and shouldered, the shoulder being generally crosswise but oblique to the axis of the shaft, a crank or pedal with an eye fitted to the shaft and an opening crosswise of the projection, a wedge-bolt having a shoulder oblique to its own axis and the axis of the shaft, and fitting the oblique shoulder on the projection of the shaft, said wedge-bolt being fitted also to the opening, and an opposing surface on the shaft or arbor to resist the crank or pedal when the bolt is moved in one direction.

2. In a bicycle, the combination with a driving shaft or arbor having a shoulder generally crosswise but oblique to its axis, a crank fitted to said shaft or arbor, a wedge-bolt fitted transversely through the eye of the crank and having a shoulder oblique to its own axis and in line with the oblique shoulder on the shaft or arbor, a sprocket-wheel having a connection with the crank and reversible on the arbor, and a fixed surface on the arbor inside of the sprocket and against which it is pressed by the crank through the action of the oblique shoulders.

In testimony whereof I affix my signature in presence of two witnesses.

RIMMON C. FAY.

Witnesses:
HORATIO J. FORGY,
W. M. McNAIR.